3,557,281
Patented Jan. 19, 1971

3,557,281
METHODS AND COMPOSITIONS CONTAINING OXAMIDE COMPOUNDS FOR CONTROLLING LIMNORIA
Phyllis D. Oja, San Francisco, Calif., assignor to The Dow Chemical Company, Midland, Mich., a corporation of Delaware
No Drawing. Continuation-in-part of application Ser. No. 541,064, Apr. 8, 1966, which is a continuation-in-part of application Ser. No. 463,881, June 14, 1965. This application Dec. 19, 1966, Ser. No. 602,544
Int. Cl. A01n 9/04, 9/20, 9/28
U.S. Cl. 424—82
33 Claims

ABSTRACT OF THE DISCLOSURE

The present invention is concerned with methods employing and compositions comprising an oxamide compound, as further defined hereinbelow, for the control of members of the genus Limnoria. The control is achieved by contacting the members of the genus Limnoria with the oxamide compound, or, more conveniently, by impregnating wood members subject to attack by members of the genus Limnoria with the oxamide compound. Thus, the present invention is also directed to articles of wood impregnated with the oxamide compound. The compositions of the present invention include those comprising the oxamide compound and one or more adjuvants which facilitate the practices of the present invention.

---

The oxamide compound of the present invention is a compound of the formula:

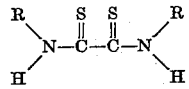

wherein R represents a member, the same in each occurrence, selected from the group consisting of alkyl; benzyl; cyclohexyl; furfuryl; radical of the formula —M—M' wherein M represents ethylene, propylene, or trimethylene, and M' represents methoxy or ethoxy; and radical derived from an alpha-amino acid by removal of the alpha-amino group, said amino acid being selected from the group consisting of α-alanine, arginine, glutamic acid, glycine, methionine, and serine.

It is noted that the present invention is also directed to certain novel compounds, of the following formula:

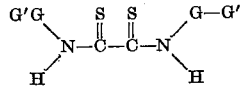

wherein G represents a member, the same in each occurrence, selected from the group consisting of ethylene, and propylene; and G' represents a member, the same in each occurrence, selected from the group consisting of methoxy and ethoxy.

This is a continuation-in-part of my copending application, Ser. No. 541,064, filed Apr. 8, 1966, which in turn was a continuation-in-part of my then copending application, Ser. No. 463,881, filed June 14, 1965, and now both abandoned.

DETAILED DESCRIPTION OF THE INVENTION

Limnoria, commonly called the true "gribble," is a marine animal of the order Isopoda, and class Crustacea. While sometimes informally called a "worm" or "shipworm" or by some other name, it is in no true sense a worm. The misnomer may arise fro the fact that its damage to wood sometimes resembles that caused in wood in aerial or terrestrial exposure by the xylophagous larvae of various insects, which larvae are informally called "worms." The gribble is more nearly related to the crab or lobster than to the worms. It attains an adult size of up to about ¼ inch and has a segmented body with seven pairs of legs and sharp, hooked claws. Respiration is carried on through platelike appendages (gills) the movement of which serves also to propel the animal in a swimming type of movement. The animal has among its mouth parts strong toothed mandibles. It occurs extensively at and just below tidal low water and is active along the entire Atlantic, Pacific, and Gulf coasts of the United States, as well as elsewhere throughout the world. Hence, in the present specification and claims the expression "marine" is used to identify the open sea as well as paritally enclosed bays and river mouths and the like wherein salinity of water varies from that of the high seas to merely distinctly brackish.

Because the ability to swim is limited, the animal utilizes its claws to attach itself to wood, and its mandibles to chew the wood to which it attaches, burrowing in to a depth of an inch or more. Frequently enormous numbers of Limnoria attack wood, as, for example, up to 100 organisms per square inch, causing a characteristic broken-up appearance of the surface of the wood. Wood surfaces which have been attacked by such large numbers are greatly weakened and may be removed by the mechanical action of water movement, particularly that of waves, thus exposing to renewed attack a new surface of the wood, lessening the bulk of the wood structure, and increasing the possibility of attack by other marine organisms.

It is an object of the present invention to provide a novel method of controlling marine organisms. It is another object of the present invention to provide a novel method for the control of marine organisms of the order Isopoda. It is also an object of the present invention to provide a novel method for the control of Limnoria. A further of the object of the present invention is to provide a novel method for treating wood. A still further object is the provision of an improved method for the preservation of, and prevention of deterioration of, wood exposed to the atttack of marine organisms. Also, it is an object to provide novel compounds and novel compositions adapted to be employed for the practice of the method of the present invention. Other objects will become apparent from the following specification and claims.

The new method for controlling marine organisms comprises contacting an organism of the genus Limnoria with a limnoricidal amount, that is, a Limnoria-controlling amount, of an oxamide compound of the following structural formula:

I
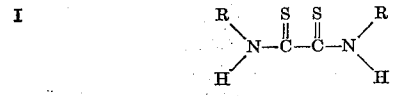

In the above and succeeding formula, R represents a member, the same in each occurrence, selected from the group consisting of alkyl; benzyl; cyclohexyl; furfuryl; radical of the formula —M—M' wherein M represents ethylene, propylene, or trimethylene, and M' represents methoxy or ethoxy; and radical derived from an alpha-amino acid by removal of the alpha-amino group, said amino acid being selected from the group consisting of α-alanine, arginine, glutamic acid, glycine, methionine and serine. Hence the oxamide compound is (A) a compound of the formula:

II
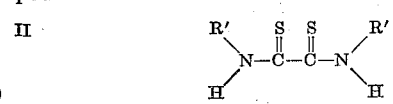

wherein R' is the same in each occurrence and represents alkyl, benzyl, cyclohexyl, or furfuryl; (B) an amino acid derivative compound of the formula:

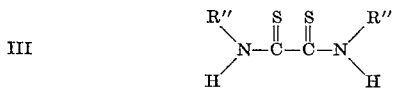

III wherein R" is the same in each occurrence and represents a radical derived from an alpha-amino acid by removal of the alpha-amino group, said amino acid being selected from the group consisting of α-alanine, arginine, glutamic acid, glycine, methionine, and serine. In the present specification and claims, the term "alkyl" is employed to designate alkyl radicals being of from 1 to 8, both inclusive, carbon atoms; or (C) a compound of the formula:

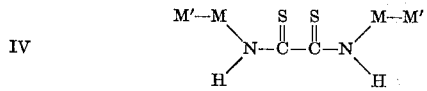

IV wherein M is the same in each occurrence and represents ethylene, propylene, or trimethylene, and M' is the same in each occurrence and represents methoxy or ethoxy. It is noted that certain of the compounds of Formula IV, those of the following formula:

V

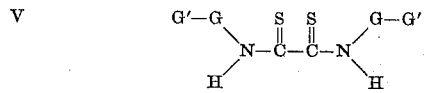

are claimed herein as novel compounds. In Formula V, G is the same in each occurrence and represents ethylene, or propylene, and G' is the same in each occurrence and represents methoxy or ethoxy. Of these novel compounds, N,N'-bis(2-methoxyethyl)dithiooxamide is especially preferred in the practices of the present invention.

The products to be employed in accordance with the present invention are crystalline solids or liquids; typically, they are of very low solubility in water and of moderate solubility in organic solvents. For the sake of convenience, the products defined by structural Formula I are referred to throughout the present specification as the "oxamide compound." The terms "controlling" and "control," as employed throughout the present specification and claims, are utilized to describe the killing of, the repelling of, or the preventing of attack by, biological organisms. These terms are never used herein to mean attracting, encouraging, or otherwise favoring the growth of biological organisms.

Representative compounds to be employed in accordance with the present invention include N,N'-dimethyldithiooxamide;
N,N'-diethyldithiooxamide;
N,N'-di-n-propyldithiooxamide;
N,N'-diisopropyldithiooxamide;
N,N'-di-n-butyldithiooxamide;
N,N'-di-sec-butyldithiooxamide;
N,N'-di-tert-butyldithiooxamide;
N,N'-di-n-pentyldithiooxamide;
N,N'-bis(3-methyl-n-butyl)dithiooxamide;
N,N'-di-n-hexyldithiooxamide;
N,N'-bis(1,1,2-trimethyl-n-propyl)dithiooxamide;
N,N'-bis(2-ethyl-n-butyl)dithiooxamide;
N,N'-bis(1-methyl-n-pentyl)dithiooximide;
N,N'-di-n-heptyldithiooxamide;
N,N'-bis(1-n-propyl-n-butyl)dithiooxamide;
N,N'-bis(1,3,3-trimethyl-n-butyl)dithiooxamide;
N,N'-bis(1-methyl-n-hexyl)dithiooxamide;
N,N'-bis(1,3-dimethyl-n-pentyl)dithiooxamide;
N,N'-di-n-octyldithiooxamide;
N,N'-bis(1-methyl-n-heptyl)dithiooxamide;
N,N'-bis(2-ethyl-n-hexyl)dithiooxamide;
N,N'-bis(1,1,3,3-tetramethyl-n-butyl)dithiooxamide;
N,N'-bis(1-ethyl-4-methyl-n-pentyl)dithiooxamide;
N,N'-dibenzyldithiooxamide;
N,N'-dicyclohexyldithiooxamide;
N,N'-difurfuryldithiooxamide;
N,N'-(dithiooxalyl)diglycine;
N,N'-(dithiooxalyl)di-O-α-alanine;
N,N'-(dithiooxalyl)di-DL-α-alanine;
N,N'-(dithiooxalyl)di-DL-serine;
N,N'-(dithiooxalyl)di-L-arginine;
N,N'-(dithiooxalyl)di-DL-methionine;
N,N'-(dithiooxalyl)-di-L-glutamic acid;
N,N'-bis(2-methoxyethyl)dithiooxamide;
N,N'-bis(2-ethoxy-ethyl)dithiooxamide;
N,N'-bis(3-methoxypropyl)dithiooxamide;
N,N'-bis(2-methoxypropyl)dithiooxamide; and
N,N'-bis(2-ethoxy-propyl)dithiooxamide.

Preferably, the oxamide compound is employed in a modified form as a composition comprising oxamide compound and one or more adjuvants. Such adjuvant can be, for example, a surface-active dispersing agent, an inert finely divided solid, or preferably, a penetrating carrier vehicle or a water-resistant binding material.

There are various manners in which contacting of Limnoria with oxamide compound can be accomplished. The contacting can be effected by treating with oxamide compound the aqueous media that constitute the habitat of Limnoria. For example, oxamide compound can be dispersed in the media, conveniently with the aid of a service-active dispersing agent. Also, oxamide compound, conveniently in admixture with a penetrating carrier vehicle, can be applied to wood for use in the habitat of Limnoria.

Such application to wood, which is preferably made before marine exposure thereof, can be as a paint, dip, spray, bath, or the like, according to procedures known to those skilled in the art. However, when it is desired to obtain more long lasting control of marine organisms, it is preferred to make application under pressure, frequently described as "impregnation," of a composition containing the oxamide compound and a penetrating carrier vehicle, such as, for example, creosote, coal-tar creosote, oil-tar creosote, coal-tar, creosote-coal-tar mixtures, petroleum oil, creosote-petroleum solutions, or various organic solvents, such as benzene, toluene, dioxane, acetone, and the like.

While the present oxamide compound is of very low solubility in water, and usually presents no serious problem of leaching, the composition can also comprise any of various water-resistant binding materials, which, when the composition has been applied to wood, will tend to bind the present limnoricidal compound to the wood and to prevent the leaching of oxamide compound into the liquid media in which the wood is placed. Suitable water-resistant binding materials are those materials which are gummy, near-solid, or solid at room temperature and which are essentially insoluble in water and soluble in at least one organic solvent and include common paraffin waxes, which can be dissolved in hydrocarbon solvents; epoxy resins, which can be dissolved in oxygenated solvents such as lower alkyl ketones and dioxane; phenol-formaldehyde type resins, which can be dissolved in various ketones and alcohols; melamine resins, of which representatives are similarly soluble; and the so-called "unsaturated polyester" liquids for room temperature cure, of which a representative example is a solution in styrene of a medium molecular weight terpolymer of maleic anhydride, phthalic acid and propylene glycol, together with such promoters as cobalt soaps, or dimethylaniline, and a peroxide type catalyst. Various other binding materials include the drying oils, numerous solvent soluble resinous thermoplastic substances, and the like.

The composition can comprise without, in addition to, or as, penetrating carrier vehicle and/or water-resistant binding vehicle, one or more other marine pest-controlling agents such as a wood preservative which controls, for example, fungal growth, insect attack, or attack of marine organisms other than Limnoria, such as Teredo, or an anti-fouling agent which controls, for example, barnacles and the like. Suitable wood preservatives are by-product oils, such as coal-tar creosote, coal-tar, petroleum oils, wood-tar creosote, oil-tar creosote, mixtures thereof, and the like; and chemicals, such as pentachlorophenol and tetrachlorophenol. Certain of the wood preservatives to be employed, notably the by-product oils, serve as adjuvant, as penetrating carrier vehicle and/or binding material and because of the combination of properties, their use is preferred. A particularly preferred adjuvant is creosote.

In general, when employing the impregnation procedures, the wood which is to be treated with oxamide compound in solution, or, optionally together with other substances as indicated above, is placed in a vessel from which the contained atmosphere is evacuated to achieve a subatmospheric pressure, such as from about 5 to about 600 millimeters mercury. Thereafter a mixture comprising oxamide compound and a penetrating carrier vehicle is introduced into the vessel so as to effect the immersion of the wood therein. Preferably this mixture is at an elevated temperature, for example, from 180° to 200° F. The contents of the vessel can thereafter be placed successively under superatmospheric pressure, such as from about 1.5 to about 100 atmospheres, in some instances more, and under subatmospheric pressure, as previously set forth, for periods of time to facilitate the impregnation of the oxamide compound solution into the wood. Techniques for facilitating penetration of the solution into the wood, such as incision, debarking, or other preparation of the wood, can be utilized.

The present oxamide compound is effective in preventing Limnoria attack when employed in paints. These can be paints that, after application, become a firm and hard substance, such as paints based upon alkyd resins, or upon such drying oils as linseed, tung-nut, and like oils. Also, the oxamide compound successfully controls Limnoria attack when incorporated into anti-fouling paints of the types that never become hard but are intended to remain viscous, yielding, and deformable. The oxamide compound functions effectively in the presence or absence of, for example, pigments, volatile oils, and the like.

Also, the oxamide compound or composition of which the oxamide compound is an active component can be applied to wood after which the wood can be painted or otherwise treated. While the oxamide compound itself presents no unusual problem, is is noted that, to make possible painting after treatment with oxamide compound, solvent, if any, should either be so volatile as to disappear, or be compatible with the paint.

The actual weight of oxamide compound to be employed can vary considerably according to the circumstances in which the oxamide compound is employed. When it is desired to control Limnoria by dispersing oxamide compound in sea water in which Limnoria infestation is usually a problem, good results are obtained when employing from about .01 to about 25 parts oxamide compound per million parts sea water. Lower concentrations can be employed under such favorable conditions as still water and relatively high levels of light and temperature. When desired, as under unfavorable conditions, higher concentrations can be employed. Where oxamide compound is to be applied to wood, good results are obtained when employing the oxamide compound to provide from about 0.001 to about 10.0, and preferably from about 0.1 to about 2.0 parts oxamide compound per hundred parts by weight of wood tissue actually impregnated thereby. When only light protection is desired, surface coating or impregnation of an outer zone of wood suffices. This can be accomplished by painting or brief dipping with an oxamide compound composition. When heavy protection is desired, deeper impregnation, which may be total impregnation, can be used.

When compositions are employed comprising the oxamide compound and one or more additives such as pest-controlling agents, and, if desired, one or more adjuvants, the amount of oxamide compound present will depend upon such factors as whether the composition is to be employed as a concentrate composition or as an ultimate treating composition, whether the composition comprises one or a plurality of additives, and the particular identity of the additive or additives employed. In a composition of which the essential components are the oxamide compound and a wood preservative, the oxamide compound can be present in an amount of from about 0.5 to about 99.5 percent and the wood preservative can be present in an amount of from about 0.5 to about 99.5 percent the percentages being based on the weight of ultimate composition. In a composition of which the essential components are the oxamide compound and a water-resistant binding material, the oxamide compound can be present in an amount of from about 0.5 to about 99.5 percent and the binding material can be present in an amount of from about 0.5 to about 99.5 percent, the percentages being based on the weight of ultimate composition. In a composition of which the essential components are the oxamide compound, a wood preservative, and water-resistant binding material, the oxamide compound can be present in an amount of from about 1.0 to about 80.0 percent, the wood preservative in an amount of from about 2.0 to about 96.0 percent, and the binding material in an amount of from about 1.0 to about 80.0 percent, all percentages being based on the weight of ultimate composition. As hereinbefore particularly set forth, the total percentage of components of any given composition is not in excess of 100 percent.

The following examples illustrate the present invention and will enable those skilled in the art to practice the same.

Example 1

Various of the products to be employed in accordance with the present invention were each separately dispersed in a small amount of acetone and the resulting dispersion added to sea water to obtain various treating solutions. Each such solution contained the respective oxamide compound in a concentration of 100 parts of compound per million parts by weight of ultimate solution. A small amount of acetone was added to sea water to obtain a control solution in which acetone was present in the same concentration, 0.5 percent, as was present in the treating solutions. Thereafter, the same known number of healthy and active *Limnoria tripunctata* organisms was placed in each solution. All solutions were held under conditions conducive to the well-being of the organisms. Observations of the organisms were made twenty-five hours after introduction of the organisms, and every twenty-five hours thereafter, to determine the percent of the organisms killed. The results are set forth in the following table. During the evaluation period, all *Limnoria tripunctata* organisms in the control solution appeared to be healthy and thriving.

TABLE I

| Oxamide compound | Percent kill of *Limnoria tripunctata* | | | | | |
| --- | --- | --- | --- | --- | --- | --- |
| | 25 hours | 50 hours | 75 hours | 100 hours | 125 hours | 150 hours |
| N,N'-dimethyldithiooxamide | 20 | 100 | | | | |
| N,N'-di-n-hexyldithiooxamide | 0 | 40 | 40 | 100 | | |
| N,N'-di-n-propyldithiooxamide | 100 | | | | | |
| N,N'-difurfuryldithiooxamide | 10 | 50 | 50 | 80 | 90 | 100 |
| Control | 0 | 0 | 0 | 0 | 0 | 0 |

Example 2

Each of N,N'-diisobutyldithiooxamide and N,N'-bis-(2-methoxyethyl)dithiooxamide was separately evaluated in accordance with the procedures of Example 1 except that only one reading was made, 165 hours following introduction of the Limnoria organisms. A 90 percent kill of Limnoria tripunctata organisms was observed in the instance of the N,N'-diisobutyldithiooxamide, and a 100 percent kill of Limnoria tripunctata, in the instance of the N,N'-bis(2-methoxyethyl)dithiooxamide, whereas in the control solution, all Limnoria tripunctata organisms appeared to be healthy and thriving.

Example 3

Each of N,N'-diethyldithiooxamide, N,N'-bis(2-ethoxyethyl)dithiooxamide, and N,N'-bis(3-methoxypropyl)dithiooxamide was separately evaluated in accordance with the procedures of Example 1 except that fewer readings were made, at 25, 50, 100, and 200 hours only. The results are set forth in the following table:

TABLE II

| Oxamide compound | Percent kill of Limnoria tripunctata | | | |
|---|---|---|---|---|
| | 25 hours | 50 hours | 100 hours | 200 hours |
| N,N'-diethyldithiooxamid | 100 | | | |
| N,N'-bis(2-ethoxyethyl)dithiooxamide | 0 | 50 | 90 | 100 |
| N,N'-bis(3-methoxypropyl)dithiooxamide | 10 | 50 | 80 | 10 |

In the control solution, the Limnoria tripunctata organisms appeared to be healthy and thriving.

Example 4

N,N'-bis(2-methoxyethyl)dithiooxamide was evaluated further for the control of Limnoria tripunctata. The evaluation was carried out in accordance with the procedures employed in the evaluations reported in the foregoing examples, except that the treating solution contained the N,N'-bis(2-methoxyethyl)dithiooxamide compound in a concentration of only 10 parts of compound per million parts by weight of ultimate composition. Examination at 165 hours showed 100 percent kill of Limnoria tripunctata organisms in the treating solution, whereas the Limnoria tripunctata organisms in the control solution appeared to be healthy and thriving.

Example 5

N,N'-dimethyldithiooxamide was dispersed in a small amount of acetone and the resulting dispersion divided and added to various containers of sea water. As a result, there was obtained a series of treating solutions containing the product in the following respective concentrations: 50, 25, 12.5, and 6.25, all expressed as parts of product per million parts of treating solution. A control sea-water solution containing 0.5 percent acetone, the acetone concentration of the treating solutions, was also prepared. Thereafter, the same known number of healthy and active Limnoria tripunctata organisms was placed in each solution and all solutions provided with wood members and otherwise held under conditions conducive to the life processes of Limnoria tripunctata. Observations of the organisms were made twenty-five hours, fifty hours, one-hundred hours, and two-hounred hours after introduction of the organisms, to determine the percent of the organisms killed. The results are set forth in the following table:

TABLE III

| Concentration of oxamide compound, p.p.m. | Percent kill of Limnoria tripunctata | | | |
|---|---|---|---|---|
| | 25 hours | 50 hours | 100 hours | 200 hours |
| 50 | 100 | 100 | 100 | 100 |
| 25 | 90 | 100 | 100 | 100 |
| 12.5 | 90 | 100 | 100 | 100 |
| 6.25 | 90 | 70 | 100 | 100 |
| 0, control | 0 | 0 | 0 | 0 |

Throughout the evaluation period, all Limnoria tripunctata organisms in the control solution appeared to be healthy and thriving.

Example 6

In another operation, N,N'-(dithiooxalyl)di-DL-α-alanine was evaluated for the control of Limnoria tripunctata. The evaluation was carried out in accordance with the procedures of Example 5, with a treating solution containing the compound in a concentration of 50 parts of compound per million parts of ultimate composition. The results are set forth in the following table:

TABLE IV

| Concentration of oxamide compound, p.p.m. | Percent kill of Limnoria tripunctata | | | |
|---|---|---|---|---|
| | 25 hours | 50 hours | 100 hours | 200 hours |
| 50 | 30 | 30 | 60 | 80 |
| 0, control | 0 | 0 | 0 | 0 |

Throughout the evaluation period, all Limnoria tripunctata organisms in the control solution appeared to be healthy and thriving.

Example 7

In yet another operation, N,N-difurfuryl-dithiooxamide was evaluated in accordance with the procedures of Example 5. The results are set forth in the following table:

TABLE V

| Concentration of oxamide compound, p.p.m. | Percent kill of Limnoria tripunctata | | | |
|---|---|---|---|---|
| | 25 hours | 50 hours | 100 hours | 200 hours |
| 50 | 50 | 80 | 100 | 1000 |
| 25 | 60 | 60 | 100 | 100 |
| 12.5 | 30 | 60 | 100 | 100 |
| 6.25 | 10 | 50 | 60 | 60 |
| 0, control | 0 | 0 | 0 | 10 |

Throughout the evaluation period, all Limnoria tripunctata organisms in the control solution, except those dead upon observation at 200 hours, appeared to be healthy and thriving.

Examples 8–12

Results essentially the same as those reported in Example 7 are obtained when evaluating in the procedures of Example 7 the following oxamide compounds: N,N'-dicyclohexyldithiooxamide; N,N' - dibenzyldithiooxamide; N,N' - di-n-octyldithiooxamide; N,N'-(dithiooxalyl)diglycine; and N,N'-(dithiooxalyl)di-DL-methionine.

Example 13

In yet another operation, N,N'-di-n-hexyldithiooxamide was evaluated in accordance with the procedures of Example 5. The results are set forth in the following table:

TABLE VI

| Concentration of oxamide compound, p.p.m. | Percent kill of Limnoria tripunctata | | | |
|---|---|---|---|---|
| | 25 hours | 50 hours | 100 hours | 200 hours |
| 50 | 60 | 100 | 100 | 100 |
| 25 | 30 | 60 | 80 | 100 |
| 12.5 | 20 | 50 | 60 | 100 |
| 6.25 | 10 | 30 | 40 | 80 |
| 0, control | 0 | 0 | 0 | 10 |

Throughout the evaluation period, all Limnoria tripunctata organisms in the control solution, except those found dead upon observation at 200 hours, appeared to be healthy and thriving.

Example 14

In a further operation, N,N'-di-n-propyldithiooxamide was also evaluated in accordance with the procedures of Example 5. The results are set forth in the following table:

TABLE VII

| Concentration of oxamide compound, p.p.m. | Percent kill of *Limnoria tripunctata* | | | |
|---|---|---|---|---|
| | 25 hours | 50 hours | 100 hours | 200 hours |
| 50 | 100 | 100 | 100 | 100 |
| 25 | 100 | 100 | 100 | 100 |
| 12.5 | 100 | 100 | 100 | 100 |
| 6.25 | 100 | 100 | 100 | 100 |
| 0, control | 0 | 0 | 0 | 0 |

Throughout the evaluation period, all *Limnoria tripunctata* organisms in the control solution except those dead upon observation at 200 hours appeared to be healthy and thriving.

Example 15

The evaluation reported in Example 9 was repeated at the 6.25 parts per million concentration level except that a second control solution, a solution containing 6.25 parts of creosote per million parts by weight of ultimate solution, was employed in addition to the previously described acetone control. The results are set forth in the following table:

TABLE VIII

| Concentration of oxamide compound, p.p.m. | Percent kill of *Limnoria tripunctata* | | | |
|---|---|---|---|---|
| | 25 hours | 50 hours | 100 hours | 200 hours |
| 6.25 | 100 | 100 | 100 | 100 |
| 0, acetone control | 0 | 0 | 0 | 0 |
| 0, creosote control | 10 | 20 | 30 | 30 |

Example 16

N,N'-di-n-butyldithiooxamide was dispersed in creosote to form a composition containing 5 percent of the compound by weight of resulting composition. The composition thus prepared was employed for the treatment of wood to control marine boring organisms.

Specimens of southern yellow pine sapwood of uniform dimension were prepared. Certain of the specimens were treated with creosote only, hereinafter called Group B specimens; others were treated with oxamide compound composition, as prepared above, hereinafter identified as Group A specimens; and others were left untreated to serve as control specimens (Group C).

In the treating operations, the wood specimens to be treated were placed one group at a time in a vessel, from which air was evacuated until a subatmospheric pressure of about 10 millimeters absolute was obtained within the vessel. Simultaneously, the treating composition was heated to a temperature of about 180° to 200° F., whereupon the heated treating composition was introduced into the vessel under the established subatmospheric pressure, thereby restoring to normal atmospheric pressure the interior of the vessel. The wood specimens were permitted to remain for a period of time fully immersed in the treating solution; thereafter the specimens were removed. In this manner, specimens of Groups A and B were treated; Group C specimens were left untreated.

Specimens of all groups were thereafter exposed to Limnoria attack. Specifically, they were affixed to the earth near the normal low tide line of the sea in a region in which Limnoria were normally prevalent and in which exposed untreated wood structures usually suffered prompt and severe damage. The specimens were periodically inspected in situ. Examination of the specimens after three and one-half years of exposure showed that specimens of Group A were free from attack by any marine borers. Specimens of Group B showed heavy attacks of Limnoria, while specimens of Group C exhibited heavy attack by both Teredo and Limnoria boring organisms. Specimens of both Groups B and C were judged to be structurally worthless. Those of Group A were judged to be structurally sound.

Example 17

Results essentially the same as those reported in Example 16 are obtained when evaluating N,N'-di-n-propyldithiooxamide in the procedures of Example 15.

The products to be employed in accordance with the present invention are prepared by reacting dithiooxamide with an amine reactant of the formula $$RNH_2$$

wherein R is as previously defined. The contacting of the reactants is conveniently carried out in an inert organic solvent such as methanol, ethanol or, preferably, water. Good results are obtained when employing at least two molecular proportions of amine reactant with each molecular proportion of dithiooxamide. The reaction is somewhat exothermic and takes place smoothly at temperatures of from 0° to 60° C. with the production of the desired product and of ammonia as a by-product. The temperature can be controlled by regulating the rate of contacting the reactants and/or by the addition and subtraction of heat as required. Following the reaction the desired product can be separated by conventional methods, i.e. washing with water, filtration and decantation. In the instance wherein R represents the radical derived from an amino acid, as above defined, it is preferred that the reaction be carried out with the sodium salt of the amino acid serving as reactant. In this preferred manner of operation, the sodium salt is prepared in situ, the reaction with dithiooxamide carred out as above described, and the reaction medium thereafter acidified to obtain the free acid product. Also in the instance wherein R represents the radical derived from an amino acid, either stereoisomer of the amine reactant can be used; however, it is often more convenient to employ a DL mixture and the resulting product is equally effective in the practice of the present invention. Most of the materials to be employed as amine reactant are commercially available. Those which are not are prepared in known procedures for the synthesis of amines: see Synthetic Organic Chemistry by Wagner & Zook, John Wiley & Sons, Inc., New York, 1953, Chapter 24 and references there cited.

In representative procedures, 127 grams of a 65 percent aqueous solution of 2-methoxyethylamine (representing 82.7 grams and 1.1 mole of the 2-methoxyethylamine) were mixed at room temperature with 60.0 grams of dithiooxamide (0.50 mole). The temperature of the resulting reaction mixture quickly rose to 45° C., and within five minutes after the mixing of the reactants, a golden orange precipitate was noted in the reaction mixture. Thereafter, over a period of three hours, the reaction mixture was heated intermittently to a temperature of 60° C. and 400 milliliters of water were added to the reaction mixture to maintain fluidity.

After the three hour period, the reaction mixture was filtered to separate the desired N,N'-bis(2-methoxyethyl)-dithiooxamide product. It melted at 97.0–99.0° C. The filtrate was held for a period of several days and then filtered again to obtain a second crop of the N,N'-bis(2-methoxyethyl)dithiooxamide product. After recrystallization from acetone, the second crop was found to melt at 98.5–100° C.

I claim:
1. A method which comprises contacting an organism of the genus Limnoria with a Limnoria-controlling amount of an oxamide compound of the formula

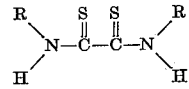

wherein R represents a member, the same in each occurrence, selected from the group consisting of 1–8 carbon atom alkyl; benzyl; cyclohexyl; furfuryl; —CH₂CO₂H;

—CH(CH₃)CO₂H; —CH(CH₂OH)CO₂H

—CH(CO₂H)CH₂CH₂SCH₃

—CH(CO₂H)CH₂CH₂CO₂H

—CH(CO₂H)CH₂CH₂CH₂NHC(=NH)NH₂; and radical of the formula —M—M' wherein M represents ethylene, propylene, or trimethylene, and M' represents methoxy or ethoxy.

2. A method which comprises applying to wood an oxamide compound in an amount sufficient to make the wood resistant to attack by an organism of the genus Limnoria, said oxamide compound being of the formula

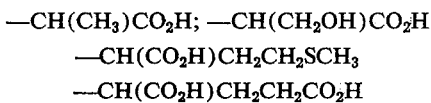

wherein R represents a member, the same in each occurrence, selected from the group consisting of 1–8 carbon atom alkyl; benzyl; cyclohexyl; furfuryl; —CH₂CO₂H;

—CH(CH₃)CO₂H; —CH(CH₂OH)CO₂H

—CH(CO₂H)CH₂CH₂SCH₃

—CH(CO₂H)CH₂CH₂CO₂H

—CH(CO₂H)CH₂CH₂CH₂NHC(=NH)NH₂; and radical of the formula —M—M' wherein M represents ethylene, propylene, or trimethylene, and M' represents methoxy or ethoxy.

3. The method of claim 2 wherein the oxamide compound in N,N'-dimethyldithiooxamide.

4. The method of claim 2 wherein the oxamide compound is N,N'-diethyldithiooxamide.

5. The method of claim 2 wherein the oxamide compound is N,N'-di-n-butyldithiooxamide.

6. The method of claim 2 wherein the oxamide compound is N,N'-di-n-hexyldithiooxamide.

7. The method of claim 2 wherein the oxamide compound is N,N'-di-n-propyldithiooxamide.

8. The method of claim 2 wherein the oxamide compound is N,N'-bis(2-methoxyethyl)dithiooxamide.

9. A composition useful for controlling Limnoria consisting essentially of 0.5 to 99.5 weight percent of an oxamide compound and 0.5 to 99.5 weight percent of a wood preservative of the group consisting of coal-tar creosote, coal-tar, petroleum oils, wood-tar creosote, oil-tar creosote, mixtures thereof, and chemicals of the group consisting of pentachlorophenol and tetrachlorophenol, said oxamide compound being of the formula

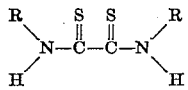

wherein R represents a member, the same in each occurrence, selected from the group consisting of 1–8 carbon atom alkyl; benzyl; cyclohexyl; furfuryl; —CH₂CO₂H;

—CH(CH₃)CO₂H; —CH(CH₂OH)CO₂H

—CH(CO₂H)CH₂CH₂SCH₃

—CH(CO₂H)CH₂CHCH₂CO₂H

—CH(CO₂H)CH₂CH₂CH₂NHC(=NH)NH₂; and radical of the formula —M—M' wherein M represents ethylene, propylene, or trimethylene, and M' represents methoxy or ethoxy.

10. The composition of claim 9 wherein the wood preservative is creosote.

11. The composition of claim 10 wherein the oxamide compound is N,N'-dimethyldithiooxamide.

12. The composition of claim 10 wherein the oxamide compound is N,N'-diethyldithiooxamide.

13. The composition of claim 10 wherein the oxamide compound is N,N'-di-n-butyldithiooxamide.

14. The composition of claim 10 wherein the oxamide compound is N,N'-di-n-hexyldithiooxamide.

15. The composition of claim 10 wherein the oxamide compound is N,N'-di-n-propyldithiooxamide.

16. The composition of claim 10 wherein the oxamide compound is N,N'-bis(2-methoxyethyl)dithiooxamide.

17. The composition of claim 10 wherein the oxamide compound is N,N'-bis(2-ethoxyethyl)dithiooxamide.

18. The composition of claim 9 wherein the wood preservative is coal-tar.

19. The composition of claim 9 wherein the wood preservative is pentachlorophenol.

20. A composition useful for cotrolling Limnoria consisting essentially of 0.5 to 99.5 weight percent of an oxamide compound and 0.5 to 99.5 weight percent of a water-resistant binding material of the group consisting of paraffin waxes, epoxy resins, phenolformaldehyde type resins, melamine resins, unsaturated room temperature curing polyesters, drying oils and solvent soluble resinous thermoplastic substances, said oxamide compound being of the formula

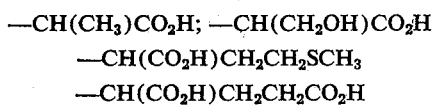

wherein R represents a member, the same in each occurrence, selected from the group consisting of 1–8 carbon atom alkyl; benzyl; cyclohexyl; furfuryl; —CH₂CO₂H;

—CH(CH₃)CO₂H; —CH(CH₂OH)CO₂H

—CH(CO₂H)CH₂CH₂SCH₃

—CH(CO₂H)CH₂CH₂CO₂H

—CH(CO₂H)CH₂CH₂CH₂NHC(=NH)NH₂; and radical of the formula —M—M' wherein M represents ethylene, propylene, or trimethylene, and M' represents methoxy or ethoxy.

21. A composition for controlling Limnoria consisting essentially of 2 to 96 weight percent of a wood preservative of the group consisting of coal-tar creosote, coal-tar, petroleum oil, wood-tar creosote, oil-tar creosote, mixtures thereof, and chemicals of the group consisting of pentachlorophenol and tetrachlorophenol, 1 to 80 weight percent of a water-resistant binding material of the group consisting of paraffin waxes, epoxy resins, phenolformaldehyde type resins, melamine resins, unsaturated room temperature curing polyesters, drying oils and solvent soluble resinous thermoplastic substances and 1 to 80 weight percent of an oxamide compound of the formula

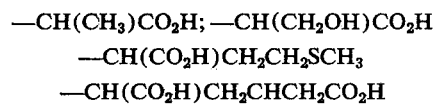

wherein R represents a member, the same in each occurrence, selected from the group consisting of 1–8 carbon atom alkyl; benzyl; cyclohexyl; furfuryl; —CH₂CO₂H;

—CH(CH₃)CO₂H; —CH(CH₂OH)CO₂H

—CH(CO₂H)CH₂CH₂SCH₃

—CH(CO₂H)CH₂CH₂CO₂H

—CH(CO₂H)CH₂CH₂CH₂NHC(=NH)NH₂; and radical of the formula —M—M' wherein M represents ethylene, propylene, or trimethylene, and M' represents methoxy or ethoxy.

22. The composition of claim 21 in which the wood preservative is creosote.

23. The composition of claim 21 in which the wood preservative is coal-tar.

24. The composition of claim 21 in which the wood preservative is pentachlorophenol.

25. An article resistant to attack by marine organisms which comprises wood impregnated with a by-product oil wood preservative of the group consisting of coal-tar creosote, coal-tar, petroleum oil, wood-tar creosote, oil-tar creosote, and mixtures thereof, to the extent of from about 5.0 to about 25.0 percent of the weight of the wood and impregnated with an oxamide compound to the extent of from about 0.01 to about 10.0 percent of the weight of the wood, said oxamide compound being of the formula

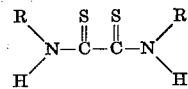

wherein R represents a member, the same in each occurrence, selected from the group consisting of 1–8 carbon atom alkyl; benzyl; cyclohexyl; furfuryl; —$CH_2CO_2H$;

—$CH(CH_3)CO_2H$; —$CH(CH_2OH)CO_2H$

—$CH(CO_2H)CH_2CH_2SCH_3$

—$CH(CO_2H)CH_2CH_2CO_2H$

—$CH(CO_2H)CH_2CH_2CH_2NHC(=NH)NH_2$; and radical of the formula —M—M' wherein M represents ethylene, propylene, or trimethylene, and M' represents methoxy or ethoxy.

26. The article of claim 25 wherein the by-product oil wood preservative is creosote.

27. The article of claim 26 wherein the oxamide compound is N,N'-dimethyldithiooxamide.

28. The article of claim 26 wherein the oxamide compound is N,N'-diethyldithiooxamide.

29. The article of claim 26 wherein the oxamide compound is N,N'-di-n-butyldithiooxamide.

30. The article of claim 26 wherein the oxamide compound is N,N'-di-n-hexyldithiooxamide.

31. The article of claim 26 wherein the oxamide compound is N,N'-di-n-propyldithiooxamide.

32. The article of claim 26 wherein the oxamide compound is N,N'-bis(2-methoxyethyl)dithiooxamide.

33. The article of claim 26 wherein the oxamide compound is N,N'-bis(2-ethoxyethyl-dithiooxamide.

References Cited

UNITED STATES PATENTS

| | | | |
|---|---|---|---|
| 2,525,075 | 10/1950 | Levesque | 260—551 |
| 2,531,283 | 11/1950 | Levesque | 260—551 |
| 2,484,257 | 10/1949 | Watson et al | 260—551 |
| 2,772,309 | 11/1956 | Doerner | 260—551 |
| 3,262,843 | 7/1966 | Peacock | 167—22 |
| 3,265,567 | 8/1966 | Rice et al. | 167—38.6 |
| 3,279,984 | 10/1966 | Ballard et al. | 167—38.6 |
| 3,318,675 | 5/1967 | Olin | 71—2.3 |

SAM ROSEN, Primary Examiner

U.S. Cl. X.R.

424—196, 320, 285; 106—15; 117—147, 148, 149; 260—551